(12) United States Patent
Chang et al.

(10) Patent No.: US 8,714,798 B2
(45) Date of Patent: May 6, 2014

(54) ILLUMINATION MODULE AND LIGHT BAR USED IN THE SAME

(75) Inventors: Chia-Ta Chang, Changhua County (TW); Ming-Hsi Chiang, Taichung County (TW); Zhan-Wei Qiu, Taichung County (TW); Hsiu-Ping Lee, Taichung County (TW); Kuo-Jui Huang, Tai Chung County (TW); Zhi-Ting Ye, Miao Li County (TW)

(73) Assignees: Dongguan Masstop Liquid Crystal Display Co., Ltd., Dongguan (CN); Wintek Corporation, Taichung (TW)

( * ) Notice: Subject to any disclaimer, the term of this patent is extended or adjusted under 35 U.S.C. 154(b) by 566 days.

(21) Appl. No.: 12/964,504

(22) Filed: Dec. 9, 2010

(65) Prior Publication Data

US 2011/0141766 A1    Jun. 16, 2011

(30) Foreign Application Priority Data

Dec. 10, 2009  (TW) ................................ 98223090 U
Dec. 31, 2009  (TW) ................................ 98224997 U

(51) Int. Cl.
*F21V 7/04* (2006.01)

(52) U.S. Cl.
USPC ...................... 362/555; 362/23.09; 362/23.16

(58) Field of Classification Search
USPC .................................... 362/23.09, 23.16, 555
See application file for complete search history.

(56) References Cited

U.S. PATENT DOCUMENTS

| | | | |
|---|---|---|---|
| 6,883,949 B2 | 4/2005 | Goto et al. | |
| 7,458,708 B2 * | 12/2008 | Sheng | ........................... 362/551 |
| 7,585,089 B2 | 9/2009 | Swantner et al. | |
| 2007/0217216 A1 | 9/2007 | Goto et al. | |
| 2009/0080213 A1 | 3/2009 | Onishi et al. | |
| 2009/0219732 A1 * | 9/2009 | Gingrich et al. | .............. 362/555 |
| 2009/0296416 A1 * | 12/2009 | Luo et al. | ...................... 362/487 |

* cited by examiner

*Primary Examiner* — Sean Gramling
(74) *Attorney, Agent, or Firm* — Muncy, Geissler, Olds & Lowe, P.C.

(57) ABSTRACT

An illumination module includes a light bar, an LED assembly, a positioning member, a sleeve and a lamp receptacle. The light bar has a first end and a second end opposite the first end. A microstructure layer or a reflective layer is formed on the light bar, and a positioning pillar is formed on an outer side of the light bar. The emitting light of the LED assembly is diffused by the microstructure layer or reflected by the reflective layer to spread over the entire light bar. The positioning member, the sleeve, the LED assembly or the lamp receptacle has at least one guide slot that engages with the positioning pillar of the light bar.

8 Claims, 5 Drawing Sheets

ILLUMINATION MODULE AND LIGHT BAR USED IN THE SAME

BACKGROUND OF THE INVENTION a. Field of the Invention

The invention relates to an illumination module and a light bar used in the same.

b. Description of the Related Art

Nowadays, a commercial PL table lamp often uses a fluorescent tube as a light source. However, for the sake of environmental protection, an LED is more suitable to be used as a light source compared with a fluorescent tube. Hence, it becomes a key issue that how to use an LED as a light source to provide an illumination module that is energy-saving, has high brightness, and conforms to an environmental protection standard. Further, when an LED is cooperated with a light bar to serve as a light source, an adjustment mechanism should be discovered to adjust the light-emitting angle, luminous uniformity and light-emitting efficiency of the light bar so as to provide the light bar with improved optical performance and a variety of uses.

BRIEF SUMMARY OF THE INVENTION

The invention provides a light bar having improved optical performance and an illumination module that is energy-saving, has high brightness and conforms to an environmental protection standard.

According to an embodiment of the invention, an illumination module includes a light bar, an LED assembly, a positioning member, a sleeve and a lamp receptacle. The light bar has a first end and a second end opposite the first end. A microstructure layer or a reflective layer is formed on the light bar, and a positioning pillar is formed on an outer side of the light bar. The LED assembly has at least one LED and is adjacent to the first end of the light bar. The emitting light of the LED is diffused by the microstructure layer or reflected by the reflective layer to spread over the entire light bar. The positioning member is connected with the second end of the light bar, and a sleeve is coupled between the light bar and the LED assembly to connect the light bar with the LED assembly. The lamp receptacle is coupled to the LED assembly, and the positioning member, the sleeve, the LED assembly or the lamp receptacle has at least one guide slot that engages with the positioning pillar of the light bar.

In one embodiment, the lamp receptacle has at least one electrode electrically connected to the LED, and a heat-dissipating element is attached to the LED assembly and the light bar.

In one embodiment, the sleeve has a foot piece, the LED assembly has a metal core printed circuit board, and the foot piece is connected to the metal core printed circuit board.

According to another embodiment of the invention, a light bar used in an illumination module is provided. The light bar has an inner side and an outer side. A positioning pillar is formed on the outer side of the light bar to engage with an external component, and a reflective layer is formed on the inner side or the outer side of the light bar. The distribution of the reflective layer on the light bar satisfies the following condition:

$$1 < \tan\theta = (R-H)/W < 4.2,$$

where angle $\theta$ is half a central angle of a cross-section of the light bar, with the central angle subtending an arc that the reflective layer overlaps, R is an radius of the cross-section, W is half a chord subtending the central angle, and H is the apothem subtending the central angle and the chord.

In one embodiment, a light-emitting angle $\theta$out of the light bar satisfies the following equation:

$$\theta out = K \times (2\theta),$$

where $\theta$out is the light-emitting angle of the light bar, K is a constant and in the range of $1 < K < 1.4$, and $2\theta$ is a central angle of a cross-section of the light bar subtending an arc that the reflective layer overlaps.

According to the above embodiments, the light bar is effective in diffusing light and has improved light-emitting efficiency. Hence, when the light bar together with an LED serves as a light source for a lamp, an energy-saving and high-brightness illumination module is obtained, and the illumination module also conforms to an environmental protection standard. Besides, the engagement between the positioning pillar and the guide slot of the sleeve may ensure that most light is emitted at a normal direction. Also, the light-emitting angle, luminous uniformity and light-emitting efficiency of the light bar can be adjusted by changing the distribution of the reflective layer on the light bar to achieve improved optical performance. Besides, the distribution of the reflective layer can be adjusted according to actual application environment to provide the light bar with a variety of uses.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having"

and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
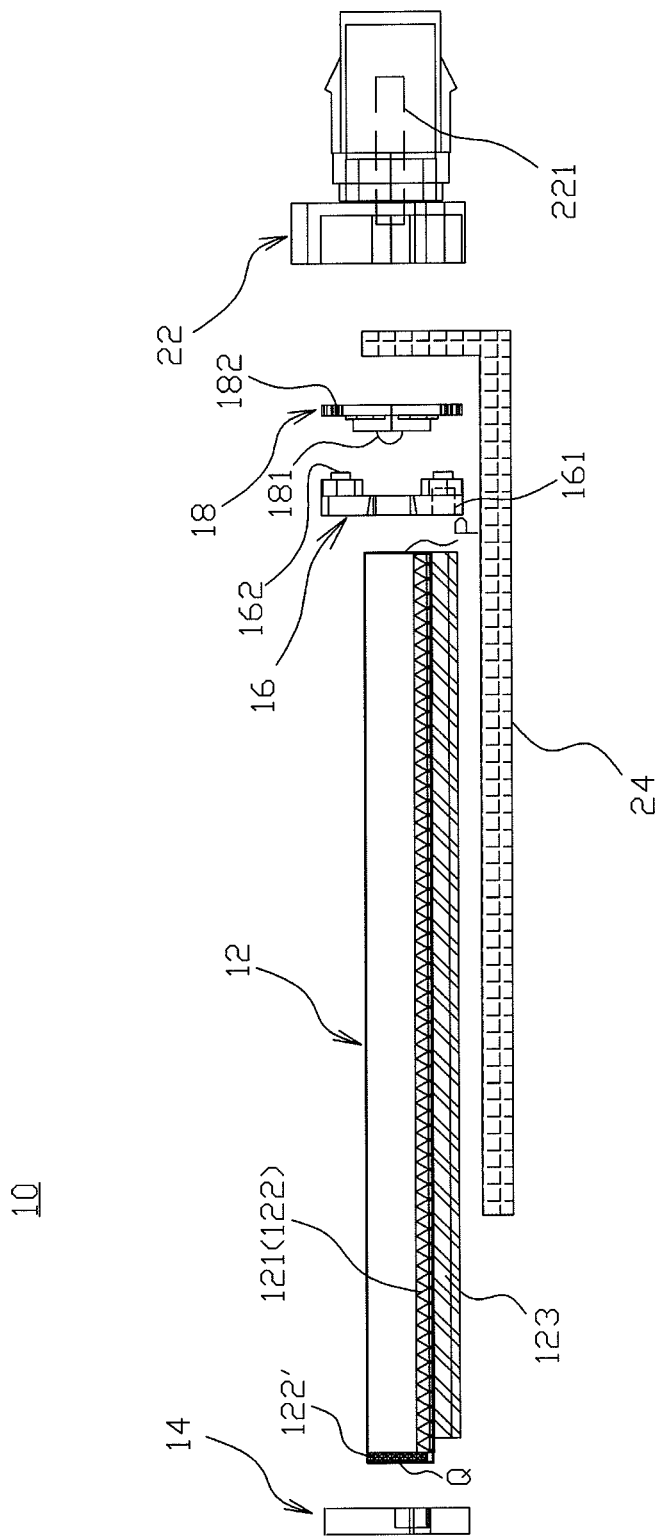
FIG. 1 shows an exploded diagram of an illumination module according to an embodiment of the invention.
Figure 2:
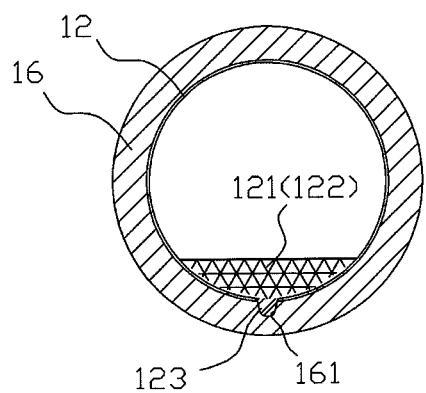
FIG. 2 shows a schematic diagram illustrating the engagement between a positioning pillar and a guide slot.

FIG. 1 shows an exploded diagram of an illumination module 10 according to an embodiment of the invention. The illumination module 10 at least includes a light bar 12, a positioning member 14, a sleeve 16, an LED assembly 18, and a lamp receptacle 22. A microstructure layer 121 or a reflective layer 122 is formed on an inner side of the light bar 12, and the LED assembly 18 having at least one LED 181 is adjacent to one end P of the light bar 12. As a result, the emitting light of the LED 181 is diffused by the microstructure layer 121 or reflected by the reflective layer 122 to spread over the entire light bar 12. The positioning member 14 is connected with one end Q (opposite the end P) of the light bar 12 to secure the illumination module 10 to a lamp (not shown). The sleeve 16 is coupled between the light bar 12 and the LED assembly 18 to connect the light bar 12 with the LED assembly 18, and the lamp receptacle 22 is coupled to the LED assembly 18. In this embodiment, a positioning pillar 123 is formed on an outer side of the light bar 12, and a guide slot 161 is formed on the sleeve 16. When the sleeve 16 is coupled to the light bar 12, the positioning pillar 123 engages with the guide slot 161 to provide accurate positioning and thus to ensure that most light is emitted at a normal direction. The shape and size of the positioning pillar 123 and the guide slot 161 are not limited, as long as a competent positioning is achieved. For example, the positioning pillar 123 may have a cross-section in the shape of a polygon or an arc. The engagement between the positioning pillar 123 and the guide slot 161 can be clearly seen in FIG. 2.

Figure 3:
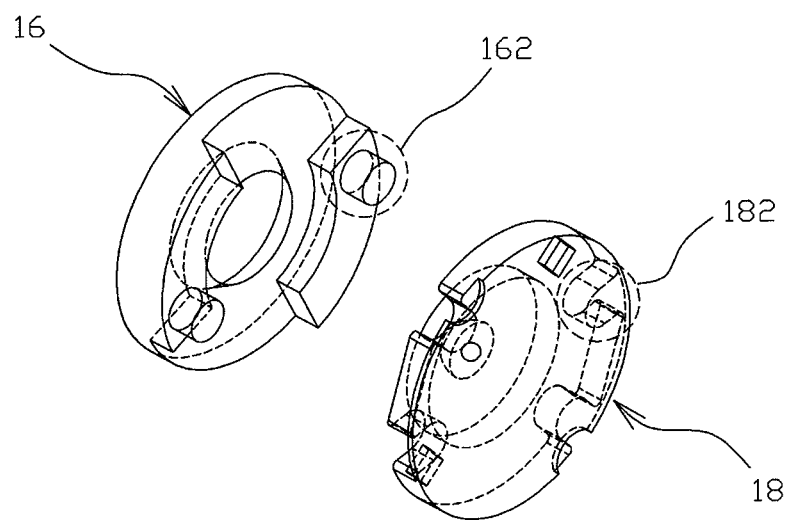
FIG. 3 shows a schematic diagram illustrating the connection between a sleeve and an LED assembly.

In one embodiment as shown in FIG. 3, the sleeve 16 may be connected to a metal core printed circuit board (MCPCB) 182 of the LED assembly 18 via a foot piece 162 of the sleeve 16. In addition, referring to FIG. 1, in one embodiment a heat-dissipating element 24 is attached to the LED assembly 18 and the light bar 12 to enhance heat dissipation, and a reflective layer 122' may be additionally formed on the end Q of the light bar 12. In an alternate embodiment, a microstructure layer 121 or a reflective layer 122 may be formed on an outer side of the light bar 12. Further, the lamp receptacle 22 may have at least one electrode 221 electrically connected to the LED 181, and the LED 181 may be a alternating current LED to omit a converter and thus further reduce fabrication costs.

Figure 4:
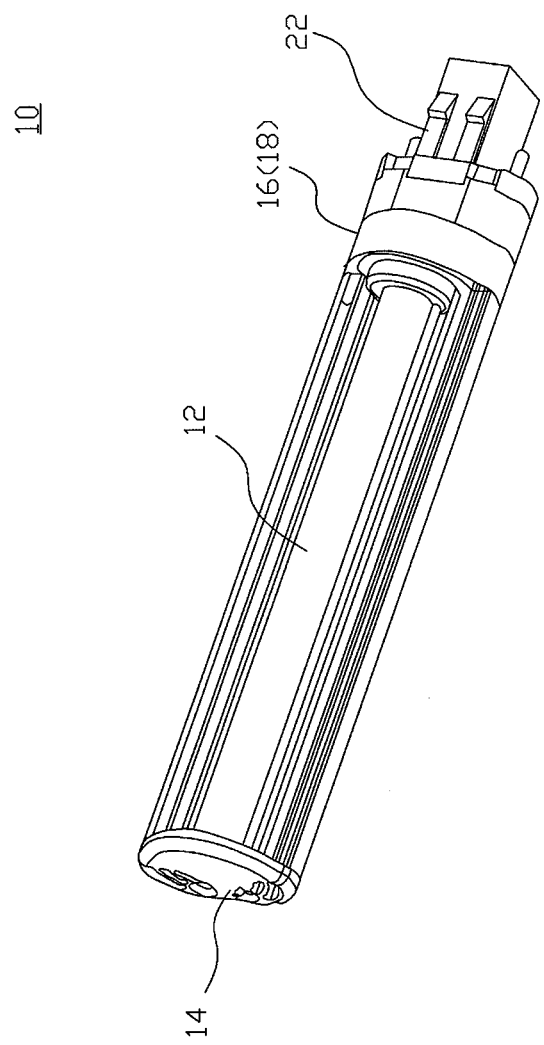
FIG. 4 shows a three-dimensional diagram of an assembled illumination module.
Figure 5:
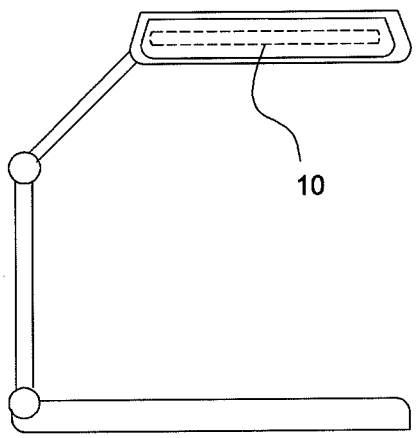
FIG. 5 shows a schematic diagram illustrating an illumination module installed on a table lamp.

FIG. 4 shows a three-dimensional diagram of an assembled illumination module 10. The illumination module 10 is used for illumination purposes. For example, the illumination module 10 may be installed on a table lamp 30 shown in FIG. 5. According to the above embodiments, the light bar 12 is effective in diffusing light and has improved light-emitting efficiency. Hence, when the light bar 12 together with an LED serves as a light source for a lamp, an energy-saving and high-brightness illumination module 10 is obtained, and the illumination module 10 also conforms to an environmental protection standard. Besides, the engagement between the positioning pillar 123 and the guide slot 161 of the sleeve may ensure that most light is emitted at a normal direction. Further, the guide slot 161 may be formed on other component of the illumination module 10, such as the positioning member 14, the LED assembly 18, the lamp receptacle 22 or the heat-dissipating element 24, to engage with the positioning pillar 123 to also achieve accurate positioning.

Figure 6:
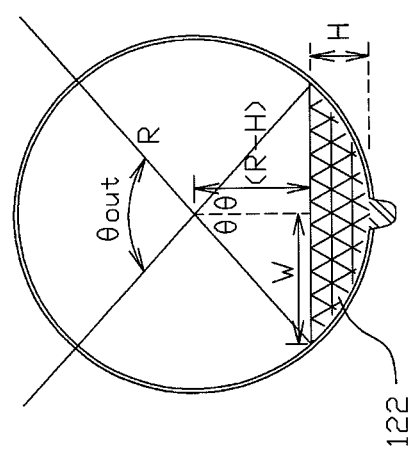
FIG. 6 shows a schematic diagram illustrating the distribution of a reflective layer on a light bar.

As shown in FIG. 6, in one embodiment the distribution of the reflective layer 122 formed on an inner side or an outer side of the light bar 12 satisfies the following equation:

$$1 < \tan\theta = (R-H)/W < 4.2,$$

where angle $\theta$ is half a central angle of a cross-section of the light bar 12, with the central angle subtending an arc that the reflective layer 122 overlaps, R is an radius of the cross-section, W is half a chord subtending the central angle, and H is the apothem subtending the central angle and the chord.

Further, as shown in FIG. 6, in one embodiment a light-emitting angle $\theta out$ of the light bar 12 satisfies the following equation:

$$\theta out = K \times (2\theta),$$

where $\theta out$ is the light-emitting angle of the light bar 12, K is a constant and in the range of $1 < K < 1.4$, and $2\theta$ is a central angle of a cross-section of the light bar 12 subtending an arc that the reflective layer 122 overlaps.

Hence, the light-emitting angle, luminous uniformity and light-emitting efficiency of the light bar 12 can be adjusted by changing the distribution of the reflective layer 122 on the light bar 12 to achieve improved optical performance. Besides, the distribution of the reflective layer 122 can be adjusted according to actual application environment to provide the light bar 12 with a variety of uses.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination module, comprising:
    a light bar having a first end and a second end opposite the first end, wherein a microstructure layer or a reflective layer is formed on the light bar, and a positioning pillar is formed on an outer side of the light bar;
    an LED assembly having at least one LED and being adjacent to the first end of the light bar, wherein the emitting light of the LED is diffused by the microstructure layer or reflected by the reflective layer to spread over the entire light bar;
    a positioning member connected with the second end of the light bar;
    a sleeve coupled between the light bar and the LED assembly to connect the light bar with the LED assembly; and
    a lamp receptacle coupled to the LED assembly;
    wherein the positioning member, the sleeve, the LED assembly or the lamp receptacle has at least one guide slot that engages with the positioning pillar of the light bar, the light bar has an inner side, the reflective layer is formed on the inner side or the outer side of the light bar, and the distribution of the reflective layer on the light bar satisfies the following condition:

$1 < \tan \theta = (R-H)/W < 4.2$, where angle $\theta$ is half a central angle of a cross-section of the light bar, with the central angle subtending an arc that the reflective layer overlaps, R is a radius of the cross-section, W is half a chord subtending the central angle, and H is the apothem subtending the central angle and the chord.

2. The illumination module as claimed in claim 1, wherein the lamp receptacle has at least one electrode electrically connected to the LED.

3. The illumination module as claimed in claim 1, further comprising a heat-dissipating element attached to the LED assembly and the light bar.

4. The illumination module as claimed in claim 1, wherein the positioning pillar has a cross-section in the shape of a polygon or an arc.

5. The illumination module as claimed in claim 1, wherein the LED is an alternating current LED.

6. The illumination module as claimed in claim 1, wherein the microstructure layer is formed on an inner side of the light bar.

7. The illumination module as claimed in claim 1, wherein a light-emitting angle $\theta\text{out}$ of the light bar satisfies the following equation:

$\theta\text{out} = K \times (2\theta)$, where $\theta\text{out}$ is the light-emitting angle of the light bar, K is a constant and in the range of $1 < K < 1.4$, and $2\theta$ is a central angle of a cross-section of the light bar subtending an arc that the reflective layer overlaps.

8. The illumination module as claimed in claim 1, wherein the sleeve has a foot piece, the LED assembly has a metal core printed circuit board, and the foot piece is connected to the metal core printed circuit board.

* * * * *